United States Patent
Schimmels et al.

[11] Patent Number: 6,021,579
[45] Date of Patent: Feb. 8, 2000

[54] SPATIAL PARALLEL COMPLIANT MECHANISM

[75] Inventors: Joseph M. Schimmels, 6108 Washington Cir., Wauwatosa, Wis. 53213; Shuguang Huang, Milwaukee, Wis.

[73] Assignee: Joseph M. Schimmels, Wauwatosa, Wis.

[21] Appl. No.: 09/053,425

[22] Filed: Apr. 1, 1998

[51] Int. Cl.[7] ..................................................... G01B 5/00
[52] U.S. Cl. .............................. 33/645; 33/503; 33/556; 248/274.1
[58] Field of Search .............................. 33/645, 503, 613, 33/556, 558, 559, 561, 568, 573; 248/274.1, 276.1, 281.11, 299.11

[56] References Cited

U.S. PATENT DOCUMENTS

| | | |
|---|---|---|
| 4,098,001 | 7/1978 | Watson . |
| 5,029,398 | 7/1991 | Ertl ............................................ 33/503 |
| 5,797,191 | 8/1998 | Ziegert ...................................... 33/503 |
| 5,832,783 | 11/1998 | Sheldon .............................. 74/490.03 |
| 5,870,834 | 2/1999 | Sheldon ................................... 33/503 |
| 5,909,939 | 6/1999 | Fugmann ................................. 33/503 |

OTHER PUBLICATIONS

Multidirectional Compliance and Constraint for Improved Robot Positioning and Bracing, J.M. Schimmels, IEEE Transactions on Robotics and Automation, pp. 1–25, (No Date).

Quasi–Static Assembly of Compliantly Supported Rigid Parts, D.E. Whitney, ASME Journal of Dynamic Systems, Measurements and Control, 104(1), 1982.

Admittance Matrix Design for Force–Guided Assembly, J.M. Schimmels and M.A. Peshkin, IEEE Transactions on Robotics and Automation, 8(2), 1992.

Force–Assembly with Friction, J.M. Schimmels and M.A. Peshkin, IEEE Transactions on Robotics and Automation, 10(4), 1994, pp. 465–479.

Kinestatic Control: A Novel Theory for Simultaneously Regulating Force and Displacement, M. Griffis and J. Duffy, ASME Journal of Mechanical Design, 113(4), 1991, pp. 508–515.

The Bounds and Realization of Spatial Stiffnesses Achieved with Simple Springs Connected in Parallel, S. Huang and J.M. Schimmels, IEEE Transaction on Robotics and Automation, 1997, pp. 1–19.

*Primary Examiner*—Diego Gutierrez
*Assistant Examiner*—Mano Fernandez
*Attorney, Agent, or Firm*—Andrus, Sceales, Starke & Sawall

[57] ABSTRACT

A mechanism capable of achieving an arbitrarily specified spatial compliant behavior is presented. The mechanism is a parallel connection of multiple individual elastic components that connect a support body to a single compliantly floated body. Each elastic component is, in itself, a low friction 6 degrees of freedom (DOF) mechanism that provides compliant constraint along and/or about a single axis. The elastic components are of three functional types: 1) a "line spring" which resists only translation along its axis, 2) a "torsional spring" which resists only rotation about its axis, and 3) a "screw spring" which resists a specified combination of translation along and rotation about its axis. Through proper selection of the connection geometry, spring constant, and functional type of each elastic component, a spatial compliant mechanism capable of passive force guidance is realized.

3 Claims, 3 Drawing Sheets

SPATIAL PARALLEL COMPLIANT MECHANISM

FIELD OF THE INVENTION

This invention relates to passive compliant devices that are not kinematically constrained in any translational or rotational direction (providing 6 degrees of freedom). Devices of this type have elastic (springlike) properties that compliantly float one body relative to another (providing as many as 6 degrees of compliant constraint). Devices capable of 6 degrees of freedom are often referred to as "spatial" mechanisms. A "passive" compliant mechanism is unpowered and consists only of linkages and passive elastic elements (springs). A "parallel" compliant mechanism is one in which each elastic component connects the support body to the compliantly floated body.

Previously, there has been no known method of achieving an arbitrarily specified spatial compliant behavior using a parallel connection of passive springs. Components with helical compliant behavior are used in this invention so that general compliant behavior can be attained in a compact parallel mechanism. With this ability to achieve an arbitrarily specified compliant behavior, the compliance that is best for an assembly task can be realized in a relatively simple device.

BACKGROUND OF THE INVENTION

Most approaches to the automation of assembly tasks have suffered from the fact that their controllers do not access information about the relative positions of the parts being assembled. Without this information, real time relative position correction is prohibited.

It has been recently recognized that, in many assembly tasks, the contact force that results from part misalignment contains the required relative positional information to identify the motion that alleviates the misalignment. Many of the previous approaches to automated assembly have ignored this form of relative positioning information. Contact forces have been regulated to prevent damage, but not exploited to improve relative positioning. To realize automated assembly, the relationship between the forces applied to the assembly and the resulting motion (this relationship is the "compliance") is designed so that the forces associated with all types of positional misalignment lead to motions that cause a reduction in part misalignment, ultimately resulting in successful assembly. The appropriate compliance is selected by evaluating the geometries of the mating parts and the magnitude of contact friction.

The design of compliance for improved force guidance was first addressed by D. E. Whitney, "Quasi-Static Assembly of Compliantly Supported Rigid Parts", ASME Journal of Dynamic Systems, Measurements, and Control, 104(1), 1982. Whitney showed that, for a restrictive class of assembly problems, force guided assembly can be achieved with proper placement of a compliance center—a very small and simple class of compliance. A group at the Charles Stark Draper Laboratory developed a device that properly locates a compliance center for chamfered peg-in-hole insertions, the remote center compliance (RCC) as shown in U.S. Pat. No. 4,098,001 to Watson. This approach to compliance design has one major limitation: restricted application. Not all assembly tasks are as simple as peg-in-hole insertion.

Recently, Schimmels et al., "Admittance Matrix Design for Force Guided Assembly", IEEE Transactions on Robotics and Automation, 8(2), 1992, provided: 1) a means of identifying those tasks that can be reliably addressed using force guidance, and 2) a systematic approach to the design of a manipulator's compliance matrix that allows reliable force guided assembly (in those tasks), if friction is zero and part misalignment is small. Concepts were validated in a testbed application of inserting parts of known simple geometries into fixtures. Later, Schimmels et al., "Force-Assembly with Friction", IEEE Transactions on Robotics and Automation, 10(4), 1994 determined that reliable force guidance is achieved despite friction, if relatively complicated compliance behavior is used. This more complicated compliance behavior must provide directional coupling (J. M. Schimmels, "Multidirectional Compliance and Constraint for Improved Robot Positioning and Bracing", IEEE Transactions on Robotics and Automation), for which case, contact forces lead to motions in directions different from that of the applied force. The mechanism presented here is a means of realizing any specified compliance behavior—the compliance matrix best for a given assembly task—so that force guided assembly is achieved passively.

One area that would greatly benefit from passive force guidance is robotic assembly. Conventional position controlled manipulators are designed to be stiff, so that external forces will produce only minimal deflection of the manipulator. Yet, to achieve fast, reliable, force guided assembly, the manipulator must not only comply with contact forces, but comply is a prescribed way (by having the prescribed compliance matrix). New controller designs that allow a manipulator to achieve the appropriate compliance for a task (to behave more dexterously) are being investigated by many researchers.

Griffis and Duffy in "Kinestatic Control: A Novel Theory for Simultaneously Regulating Force and Displacement", ASME Journal of Mechanical Design, 113(4), 1991 have described the use of a 6 DOF passive parallel compliant mechanism for use in simultaneously regulating force and displacement in robotic assembly. Their device consisted of 6 elastic components that transmit only translational force along the axis of the component. Huang and Schimmels in "The Bounds and Realization of Spatial Stiffnesses Achieved with Simple Springs Connected in Parallel", IEEE Transaction on Robotics and Automation, (accepted for publication), 1997, however, showed that a mechanism of this type is only capable of achieving a very small set of general spatial compliant behavior. To eliminate this restriction, the inventors have discovered by means of the present invention, that, to achieve an arbitrary spatial compliant behavior, the elastic components connected in parallel must have helical compliant behavior. To realize this behavior, at least one of the elastic components connected in parallel must transmit force along and torque about its axis. This form of coupled translational and rotational elastic behavior is necessary in spatial assembly to achieve robust force guidance—force guidance with the capability to tolerate finite positioning errors and finite values of friction.

The present invention has evolved from initial research conducted by the inventors and set forth in Appendix I entitled "Achieving an Arbitrary Spatial Stiffness With Springs Connected in Parallel."

Using the mechanism described here, the best compliance for an assembly task could be built into a passive mechanism that is mounted on the end-effector of a conventional robot. The attractive features of the passive end-effector mounted compliant device are its simplicity, its reliability, and its speed.

SUMMARY OF THE INVENTION

A mechanism capable of achieving an arbitrarily specified spatial compliant behavior is presented. The mechanism is a parallel connection of multiple individual elastic components that connect a support body to a single compliantly floated body. Each elastic component is, in itself, a low friction 6 degrees of freedom (DOF) mechanism that provides compliant constraint along and/or about a single axis. The elastic components are of three functional types: 1) a "line spring" resists only translation along its axis, 2) a "torsional spring" resists only rotation about its axis, and 3) a "screw spring" resists a specified combination of translation and rotation along and about its axis. These three functional types are embodied in four structural types: 1) the "line spring", 2) the "torsional spring", 3) the "translational-type screw spring", and 4) the "rotational-type screw spring". The structure of each type is briefly described below.

Common to all four structural types of elastic component is the connection of the component to the support body and the floated body. Each component connects to both the floated body and to the support body using a 2 axis gimbal (i.e., a universal joint). The intersection of the two gimbal axes defines the connection point to the body. The line connecting the connection point on the support body and the connection point on the floated body defines the axis of the elastic component. These 2 connections provide 4 DOF.

Two additional DOF are obtained using joints that act only: 1) along the component axis (using a prismatic joint), 2) about the component axis (using a revolute joint), or 3) a combination of these two motions (using a helical joint). These joints are referred to as the component's "axis joints". (Alternately, each of these joints can be viewed as being generalized helical joints, with the revolute joint having a helix of zero pitch, the prismatic joint having a helix of infinite pitch, and the helical joint having a helix of finite pitch.) To minimize friction, these three types of axis joints are obtained using the following three types of ball bearings: 1) a ball spline (prismatic), 2) a conventional (revolute) ball bearing, and 3) a ball screw (helical). From this palette of three axis joint types, two are used. The two types selected depend on the type of spatial compliance required.

In all cases, one of these axis joints is compliantly constrained along/about its 1 DOF and the other axis joint is unconstrained along/about its 1 DOF. These two joints are referred to as the "axis elastic-joint" and the "axis free-joint", respectively.

Conventional helical springs are used in the preferred embodiment of the "axis elastic-joint". To minimize friction without the use of additional bearings, the conventional springs are used either in a revolute joint or in a prismatic joint (not used in the helical joint). Two helical compression springs constraining a ball spline nut are used to provide bilateral constraint resisting translation along the component axis. Two helical torsional springs constraining a revolute bearing are used to provide bilateral constraint resisting rotation about the component axis. The material and geometric properties of the helical springs determine the "spring constant" of the elastic component.

In the preferred embodiment, the "axis free-joint" may be any one of the three axis joint types: prismatic, revolute, or helical. The pitch of helix in the axis free-joint determines the amount of stiffness in translation along the component axis relative to the amount in rotation about the component axis. If a revolute joint is used (pitch of the axis free-joint is zero), only translation along the axis can be compliantly resisted. If a prismatic joint is used (pitch is infinite), only rotation about the axis can be compliantly resisted. If a helical joint is used (pitch is finite), a specified combination of rotation and translation is resisted. A helical axis free-joint in the component provides "helical compliant behavior" for which a specified combination of translation and rotation about the component axis is maximally resisted and a different "reciprocal" combination (motion along the helix) is not resisted at all.

The helical compliant behavior available in elastic components of this type is essential in attaining general spatial compliant behavior. Without these helical components, general compliant behavior can not be attained in a parallel mechanism (Huang and Schimmels, IEEE, 1997, supra).

In summary, using several of these elastic components in parallel, any specified spatial compliant behavior can be achieved. To achieve the specified compliant behavior, the following properties are selected for each elastic component: 1) the geometry of the connection (the connection locations on the support body and the compliantly floated body), 2) the spring constant of the axis elastic-joint (bilateral spring), and 3) the pitch of the axis free-joint.

The number and type of elastic components used in the mechanism is determined by the desired spatial compliance which is normally specified with a 6×6 stiffness matrix (or its inverse a 6×6 compliance matrix). The described mechanism is capable of achieving passive force guided assembly when the appropriate stiffness matrix for an assembly task is specified.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
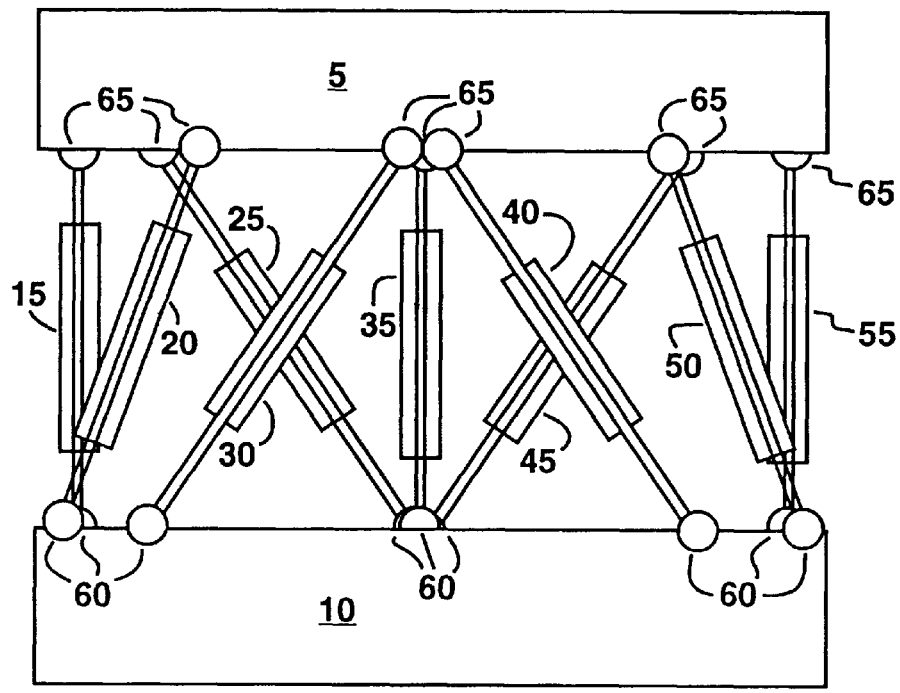
FIG. 1 is a diagrammatic view of a 6 DOF compliant mechanism consisting of a plurality of elastic components connected in parallel. The elastic components are of four structural types that are described using FIGS. 2–6 below.

As illustrated in FIG. 1, the present invention is a six (6) degree of freedom compliant device consisting of a compliantly floated body 5, a support body 10, and multiple elastic components 15, 20, 25, 30, 35, 40, 45, 50, 55. The support body 10 is rigidly attached to a moving body, such as the end-effector of a conventional robot manipulator. The compliantly floated body 5 rigidly holds a part to be assembled into a mating part. The multiple elastic components 15–55 are selected from a palette of four different elastic component structural types that are illustrated in FIGS. 3–6, and will be described in detail hereafter.

Each elastic component is a low-friction mechanism that provides 6 degrees of freedom and elastic behavior along and/or about a single axis. Ball bearings are used throughout to reduce friction and to ensure that elastic (or springlike) behavior dominates the mechanical resistance to deflection.

Figure 2:
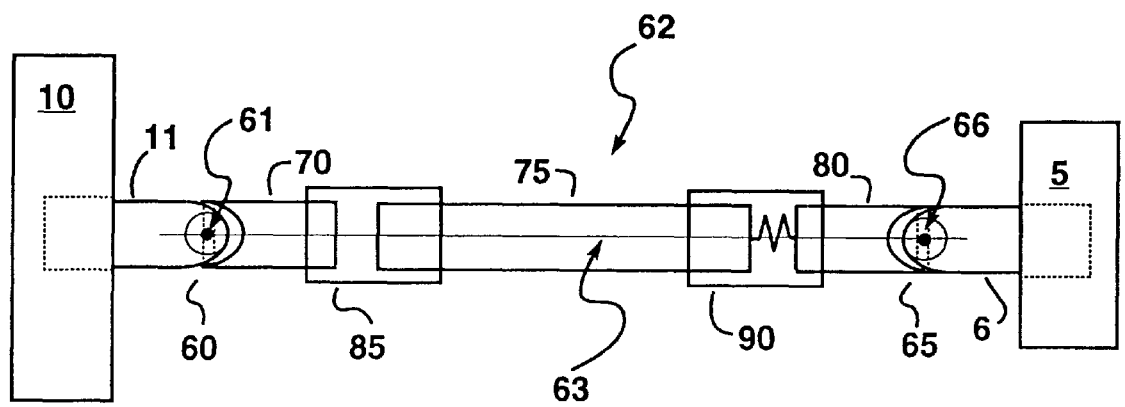
FIG. 2 is a diagrammatic view of a typical elastic component that identifies the elements common to all four structural types.

An arrangement of elements common to all four types of elastic components is illustrated in FIG. 2. The single axis of compliance in each typical elastic component generally identified by the numeral 62 is defined by the geometry of the connection of the specific components 15–55 to respective portions 6 and 11 of the compliantly floated body 5 and the support body 10. Each component 15–55 connects to the support body 10 using a low friction 2-axis gimbal 60 (with orthogonal revolute joints that intersect at point 61) and connects to the compliantly floated body 5, again using a low friction 2-axis gimbal 65 (with orthogonal revolute joints that intersect at point 66). Gimbals 60, 65 are preferably in the form of well known universal joints. The line that joins points 61 and 66 defines the longitudinal or central axis 63 of the elastic component 62. This type of connection ensures that only forces along or about the component axis 63 may be transmitted. Or, equivalently, only motions along or about the axis may be constrained.

The two sets of 2-axis gimbals 60, 65 provide 4 degrees of freedom. Each elastic component 62 has 2 additional degrees of freedom at two joints 85, 90 along the elastic component axis. These two joints 85, 90 are referred to as the component's "axis joints". One of these axis joints 90 is compliantly constrained along/about its 1 DOF and the other axis joint 85 is unconstrained along/about its 1 DOF. These two joints are referred to as the "axis elastic-joint" 90 and the "axis free-joint" 85, respectively. The two axis joints 85, 90 separate a shaft assembly along the component axis 63 into three components. In FIG. 2, the axis free-joint 85 links a support shaft 70 to an intermediate shaft 75 but allows 1 DOF relative motion. The axis elastic-joint 90 links a float shaft 80 to the intermediate shaft 75 but allows 1 DOF relative motion. The locations of the axis-free joint 85 and the axis elastic-joint 90 can be interchanged, but are illustrated as such in the preferred embodiments of FIGS. 3–6.

The two axis joints 85, 90 act only: 1) along the component axis 63 (a prismatic joint), 2) about the component axis 63 (a revolute joint), or 3) a combination of these two motions (a helical joint). From this palette of three axis joint types, two are used.

The selection of the type of joint (revolute, prismatic, or helical) used for the axis elastic-joint 90 and the axis free-joint 85 determine the functional and structural type of the elastic component. The four structure types depicted in FIGS. 3–6 are: 1) a line spring 100, 2) a torsional spring 200, 3) a translational-type screw spring 300, and 4) a rotational-type screw spring 400. The line spring 100 has a prismatic axis elastic-joint and a revolute axis free-joint. The torsional spring 200 has a revolute axis elastic-joint and a prismatic axis free-joint. The two screw springs 300, 400 each have a helical axis free-joint. The translational-type screw spring 300 has a prismatic axis elastic-joint; whereas, the rotational-type screw spring 400 has a revolute axis elastic joint. The function and structure of these four types of elastic component are individually described in more detail below.

Line Spring

Figure 3:
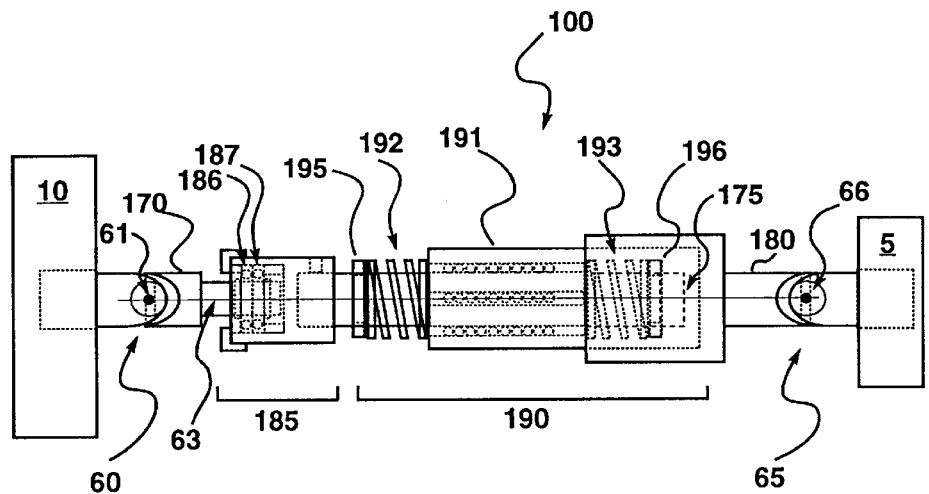
FIG. 3 is a diagrammatic view of a line spring mechanism.

The preferred embodiment of line spring 100 is illustrated in FIG. 3. The function of line spring 100 is to compliantly resist translation along its axis but resist no other form of motion. The structure of line spring 100 consists of the two sets of 2-axis gimbals 60, 65 (which define the axis of the line spring 100), a revolute axis free-joint 185, and a prismatic axis elastic-joint 190.

The two sets of 2-axis gimbals 60, 65 are identical in function and structure to those previously described for the "typical" elastic component of FIG. 2.

The revolute axis free-joint 185 consists of 2 conventional rotary ball bearings 186, 187 loaded against each other to prevent all motion other than rotation about the component central axis 63. A support shaft 170 is attached to gimbal 60 and has an inner end coupled to a cylindrical intermediate shaft 175 by the axis free-joint 185. Ball bearings 186, 187 are mounted on support shaft 170.

The two sets of 2-axis gimbals 60, 65 together with the revolute axis free-joint 185 allow 5 degrees of freedom. Only translation along the component central axis 63 can be resisted.

The prismatic axis elastic-joint 190 resists deflection along this axis 63. It consists of the cylindrical intermediate shaft 175, a linear bearing 191, and two compression springs 192, 193 that bilaterally compliantly constrain the linear bearing 191 between two snap rings 195, 196 attached to the intermediate shaft 175. The two compression springs 192, 193 each unilaterally constrain the linear bearing 191 therebetween (each in compression only). If the two springs 192, 193 are not preloaded against each other, the effective stiffness of the joint is equal to the stiffness k of the two identical springs. If the two are preloaded to eliminate the possibility of translational backlash, the effective stiffness is k if each spring 192, 193 has stiffness k/2.

The force generated by the prismatic axis elastic-joint 190 is determined by the deflection of the spring and the orientation of the component central axis 63. The direction and line of action of the force is determined by the geometry of the connection of the line spring 100 to the support body 10 and the floated body 5. The magnitude of the force is determined by the effective stiffness of the axis elastic-joint 190 and the deflection along the component axis 63.

Consider an arbitrary twist δX (deflection in translation and rotation) of a coordinate frame attached to the floated body at connection point 66, $$\delta \underline{X} = \begin{bmatrix} \delta \underline{x} \\ \delta \underline{\theta} \end{bmatrix}$$

where θ is the angular displacement.

If the direction along the component axis 63 is defined as n, then the force f transmitted by the elastic component is:

$$f = k(\delta \underline{x} \cdot \underline{n})\underline{n}$$

and the torque τ transmitted is zero.

The wrench F (force and torque) that results from the imposed twist δX for a line spring, then is:

$$\underline{F} = \begin{bmatrix} \underline{f} \\ \underline{\tau} \end{bmatrix} = k(\delta \underline{x} \cdot \underline{n}) \begin{bmatrix} \underline{n} \\ \underline{0} \end{bmatrix}$$

The line spring 100 can only transmit a pure force at the connection point 66 of the elastic component to the floated body 5.

Torsional Spring

Figure 4:
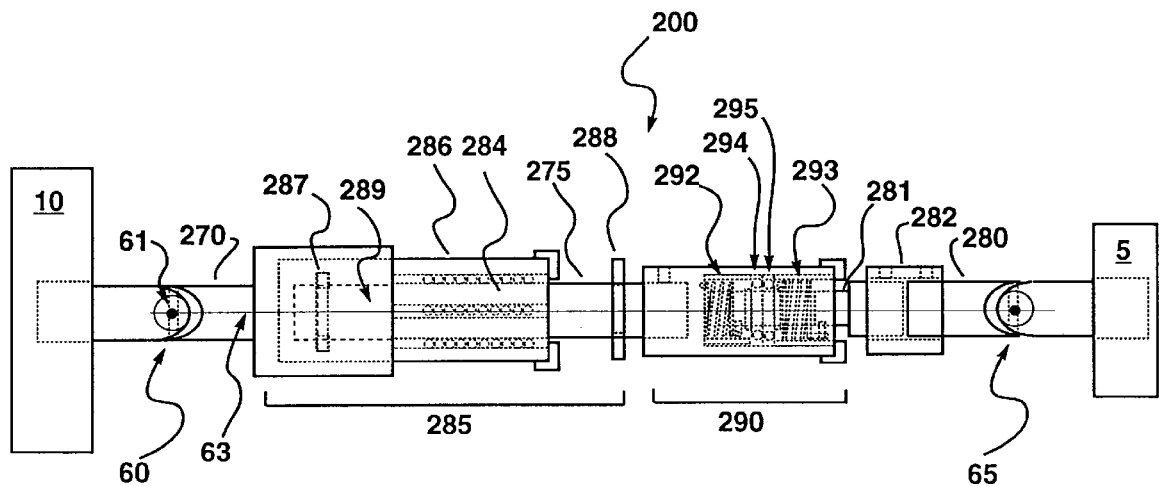
FIG. 4 is a diagrammatic view of a torsional spring mechanism.

The preferred embodiment of the torsional spring 200 is illustrated in FIG. 4. The function of torsional spring 200 is to compliantly resist rotation about its axis but resist no other form of motion. The structure of torsional spring 200 consists of the two sets of 2-axis gimbals 60, 65 (which define the axis of the torsional spring 200), a prismatic axis free-joint 285, and a revolute axis elastic-joint 290.

The two sets of 2-axis gimbals 60, 65 are identical in function and structure to those previously described for the typical elastic component 63 of FIG. 2.

The prismatic axis free-joint 285 consists of a ball spline 284 mounted on intermediate shaft 275 so as to prevent all motion other than translation along the component central axis 63. A movable ball spline nut 286 is prevented from being removed from a spline shaft end 289 of shaft 275 by two slip rings 287, 288. A support shaft 270 is attached to gimbal 60 and has an inner end coupled to a bored intermediate shaft 275 by the axis free-joint 285.

The two sets of 2-axis gimbals 60, 65 together with the prismatic axis free-joint 285 allow 5 degrees of freedom. Only rotation about the component axis 63 can be resisted.

The revolute axis elastic-joint 290 resists rotation about this axis 63. It consists of the bored intermediate shaft 275, a two piece float shaft having components 281, 282 joined by a coupling 282, two conventional (rotary) bearings 294, 295 mounted adjacent to each other on the float shaft 281, and two helical torsional springs 292, 293 mounted on float shaft 281 that bilaterally compliantly constrain the rotational position of the float shaft 280 relative to the intermediate shaft 275. The two helical torsional springs 292, 293 each unilaterally constrain the relative rotary motion of the intermediate shaft 275 with respect to the float shaft 280 (act only in the direction that causes the coils to expand). If the two springs 292, 293 are not preloaded against each other, the effective stiffness of the joint is equal to the stiffness k of the two identical springs 292, 293. If the two are preloaded to eliminate the possibility of rotational backlash, the effective stiffness is k if each spring 292, 293 has stiffness k/2.

The torque generated by the revolute axis elastic-joint 290 is determined by the deflection of the spring and the orientation of the elastic component axis 63. The direction of the torque is determined by the geometry of the connection of the torsional spring 200 to the support body 10 and the floated body 5. The magnitude of the torque is determined by the effective stiffness of the axis elastic-joint 290 and the angular deflection about the component axis 63.

Consider an arbitrary twist δ X (deflection in translation and rotation) of a coordinate frame attached to the floated body at connection point 66, $$\delta \underline{X} = \begin{bmatrix} \delta x \\ \delta \theta \end{bmatrix}$$

where θ is the angular displacement.

If the direction along the component axis 63 is defined as n, then the torque τ transmitted by the elastic component is:

$$\tau = k(\delta\theta \cdot n)n$$

and the force f transmitted is zero.

The wrench F (force and torque) that results from the imposed twist δ X for a line spring, then is:

$$\underline{F} = \begin{bmatrix} f \\ \tau \end{bmatrix} = k(\delta\theta \cdot \underline{n}) \begin{bmatrix} 0 \\ \underline{n} \end{bmatrix}$$

The torsional spring 200 can only transmit a pure torque about the elastic component axis 63 to the floated body 5.

Screw Springs

The wrenches transmitted using the line spring 100 or torsional spring 200 are either a pure force or a pure torque at the connection point 66 to the floated body 5. The limitations imposed on the form of the wrench produced have associated with them limitations on the form of spatial compliance behavior that can be achieved (using only these two types of springs). The screw spring behavior—behavior that couples the translational and rotational components of motion along/about an axis—must be used to realize arbitrary spatial compliance matrices. Two types of screw springs 300, 400 are described in detail below.

Translational-type Screw Spring

Figures 5, 6:
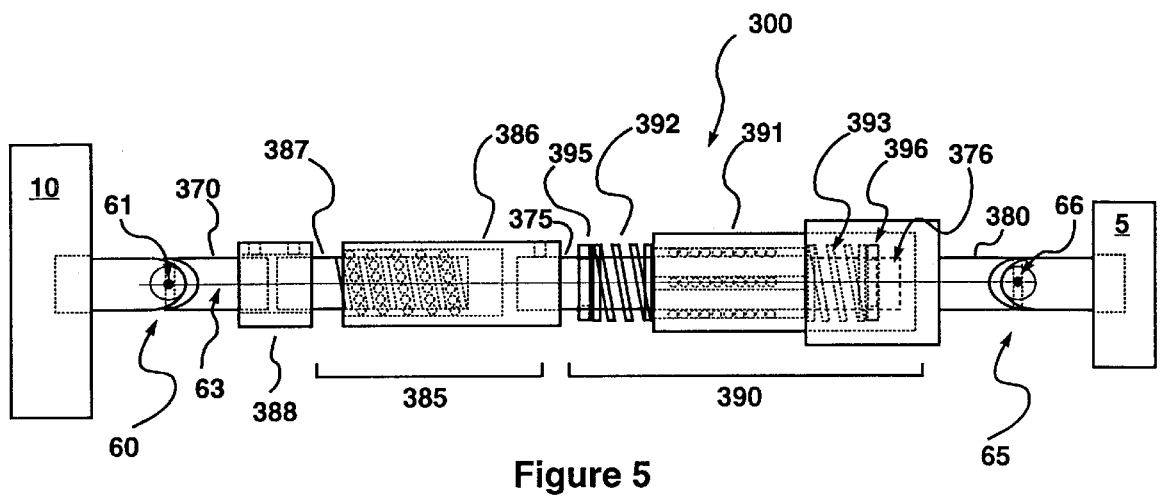
FIG. 5 is a diagrammatic view of a translational-type screw spring mechanism.
FIG. 6 is a diagrammatic view of a rotational-type screw spring mechanism.

The preferred embodiment of the translational-type screw spring 300 is illustrated in FIG. 5. The function of a screw spring is to compliantly resist a specified combination of translation along and rotation about its axis but resist no other form of motion. The structure of a translational-type screw spring consists of the two sets of 2-axis gimbals 60, 65 (which define the axis of the screw spring 300), a helical axis free-joint 385, and a prismatic axis elastic-joint 390.

The two sets of 2-axis gimbals 60, 65 are identical in function and structure to those previously described for the typical elastic component 62 of FIG. 2.

The helical axis free-joint 385 consists of a ball nut 386 mounted on one end of an intermediate shaft 375 and a ball screw 387. This 1 DOF joint prevents all motion other than a specified combination of translation along and rotation about the component central axis 63. That combination of translation and rotation is specified by the pitch h of the ball screw 387 which is linked to a support shaft 370 attached to gimbal 60 by a coupling 388. Ball screw 387 is threadably engageable in ball nut 386 for slidable and rotational movement therein.

The two sets of 2-axis gimbals 60, 65 together with the helical axis free-joint 385 allow 5 degrees of freedom. Only a reciprocal combination of translation along and rotation about the component axis can be resisted. The reciprocal combination is a screw axis with the same direction but a pitch of opposite sign.

The prismatic axis elastic-joint 390 resists deflection along this screw axis. It consists of the splined end 376 of intermediate shaft 375, a ball spline nut 391 movably mounted on intermediate shaft 375, and two compression springs 392, 393 that bilaterally compliantly constrain the ball spline nut 391 between two snap rings 395, 396 attached to the intermediate shaft 375 and the splined end 376, respectively. Compression spring 392 encircles intermediate shaft 375 between snap ring 395 and one end of ball spline nut 391. Compression spring 393 encircles the splined end 376 between snap ring 396 and the other end of ball spline nut 391. The two compression springs 392, 393 each unilaterally constrain the ball spline nut 391 (each in compression only). If the two springs are not preloaded against each other, the effective stiffness of the joint is equal to the stiffness of the two identical springs, k. If the two are preloaded to eliminate the possibility of translational backlash, the effective stiffness is k if each spring 392, 393 has stiffness k/2.

The wrench generated by the translational-type screw spring 300 is determined by the deflection of the spring, the orientation of the component axis 63, and the pitch of the ball screw 387 helix. The direction of the force and torque are determined by the geometry of the connection of the screw spring to the support body 10 and the floated body 5. The magnitude of the force and torque are determined by the effective stiffness of the axis elastic-joint 390 and the magnitude of the screw deflection along and about the component axis 63.

Consider an arbitrary twist δ X (deflection in translation and rotation) of a coordinate frame attached to the floated body at connection point 66, $$\delta \underline{X} = \begin{bmatrix} \delta \underline{x} \\ \delta \underline{\theta} \end{bmatrix}$$

where 80 is the angular displacement.

If the direction along the component axis 63 is defined as n, then the force f transmitted by the elastic component is determined by the relative deflection of the intermediate shaft 375 with respect to the float shaft 380. Along direction n, the displacement of the float shaft 380 is: $x_f = \delta \underline{x} \cdot \underline{n}$. Since the intermediate shaft 375 is connected to the helical joint, the displacement of 375 along direction n is associated with the angular displacement about the same axis, i.e., $x_i = h\delta\theta \cdot \underline{n}$. The relative deflection of the two ends of the spring along axis n is:

$$\delta_x = x_f - x_i$$
$$= \delta \underline{x} \cdot \underline{n} - h\delta\underline{\theta} \cdot \underline{n}$$

For an arbitrary displacement δ X, the force imposed on the body is:

$$\underline{f} = (k\delta_x)\underline{n}$$
$$= k(\delta \underline{x} \cdot \underline{n} - h\delta\underline{\theta} \cdot \underline{n})\underline{n}$$

Since the transmitted torque must be along the component axis 63 n, the torque associated with this force at the coordinate system based at 66 is:

$$\underline{\tau} = -h\underline{f}$$
$$= -kh(\delta \underline{x} \cdot \underline{n} - h\delta\underline{\theta} \cdot \underline{n})\underline{n}$$

Then combining, we obtain:

$$\underline{F} = \begin{bmatrix} \underline{f} \\ \underline{\tau} \end{bmatrix} = k(\delta \underline{x} \cdot \underline{n} - h\delta\underline{\theta} \cdot \underline{n})\begin{bmatrix} \underline{n} \\ -h\underline{n} \end{bmatrix}$$

A screw spring can only transmit a specified combination of force along and torque about the component axis 63 to the floated body 5. For the translational-type screw spring, that combination is directly related to the pitch of the ball screw 387 used in the axis free-joint 385.

Rotational-type Screw Spring

The preferred embodiment of the rotational-type screw spring 400 is illustrated in FIG. 6. The function of a screw spring is to compliantly resist a specified combination of translation along and rotation about its axis but resist no other form of motion. The structure of a rotational-type screw spring consists of the two sets of 2-axis gimbals 60, 65 (which define the axis of the line spring), a helical axis free-joint 485, and a revolute axis elastic-joint 490.

The two sets of 2-axis gimbals 60, 65 are identical in function and structure to those previously described for the typical elastic component of FIG. 2.

The helical axis free-joint 485 consists of a ball nut 486 mounted on intermediate shaft 475 and a ball screw 487 which is linked to a support shaft 470 attached to gimbal 60 by a coupling 488. Ball screw 487 is threadably engageable in ball nut 486 for sliding and rotational movement therein. This 1 DOF joint prevents all motion other than a specified combination of translation along and rotation about the component central axis 63. That combination of translation and rotation is specified by the pitch h of the ball screw 487.

The two sets of 2-axis gimbals 60, 65 together with the helical axis free-joint 485 allow 5 degrees of freedom. Only a reciprocal combination of translation along and rotation about the component axis 63 can be resisted. The reciprocal combination is a screw axis with the same direction but a pitch of opposite sign.

The revolute axis elastic-joint 490 resists rotation about this axis. It consists of the bored intermediate shaft 475, a two piece float shaft having components 480, 481 joined by a coupling 482, two conventional (rotary) bearings 494, 495 mounted adjacent to one another in float shaft 481, and two helical torsional springs 492, 493 mounted on float shaft 481 that bilaterally compliantly constrain the rotational position of the float shaft 480 relative to the intermediate shaft 475. The two helical torsional springs 492, 493 each unilaterally constrain the relative rotary motion of the intermediate shaft 475 with respect to float shaft 480 (act only in the direction that causes the coils to expand). If the two springs are not preloaded against each other, the effective stiffness of the joint is equal to the stiffness k of the two identical springs 492, 493. If the two are preloaded to eliminate the possibility of translational backlash, the effective stiffness is k if each spring 492, 493 has stiffness k/2.

The wrench generated by the rotational-type screw spring 400 is determined by the deflection of the spring, the orientation of the component axis 63, and the pitch of the ball screw 487 helix. The direction of the force and torque are determined by the geometry of the connection of the screw spring 400 to the support body 10 and the floated body 5. The magnitude of the force and torque are determined by the effective stiffness of the axis elastic-joint 490 and the magnitude of the screw deflection along and about the component axis 63.

Consider an arbitrary twist δ X (deflection in translation and rotation) of a coordinate frame attached to the floated body at connection point 66, $$\delta \underline{X} = \begin{bmatrix} \delta \underline{x} \\ \delta \underline{\theta} \end{bmatrix}$$

where θ is the angular displacement.

If the direction along the component axis 63 is defined as n, then the torque generated by the rotational spring depends on the relative angle change. About axis n, the angular displacement of float axis 480, is: $\delta\theta_f = \delta\underline{\theta} \cdot \underline{n}$. Since the intermediate axis 475 is connected to the helical joint, the angular displacement of the intermediate axis 475 about the axis n is associated with the positional displacement along the same axis, i.e., $\theta_i = h^{-1}(\delta x \cdot n)$ where h is the pitch of the ball screw 487.

The relative angular displacement of the rotational spring is:

$$\delta\theta = \theta_f - \theta_i$$
$$= \delta\underline{\theta} \cdot \underline{n} - \frac{1}{h}\delta\underline{x} \cdot \underline{n}$$

$$= \delta\underline{\theta} \cdot \underline{n} - q\delta\underline{x} \cdot n$$

where $q = 1/h$.

The torque generated about this axis by the spring is:

$$\tau = k[\delta\theta \cdot n - q\delta x \cdot n]n$$

and the force generated by the rotational spring is:

$$f = -q\tau$$

Then combining, we obtain:

$$\underline{F} = \begin{bmatrix} \underline{f} \\ \underline{\tau} \end{bmatrix} = k(\delta\underline{\theta} \cdot \underline{n} - q\delta\underline{x} \cdot \underline{n}) \begin{bmatrix} -q\underline{n} \\ \underline{n} \end{bmatrix}$$

$$= -kq(\delta\underline{\theta} \cdot \underline{n} - q\delta\underline{x} \cdot \underline{n}) \begin{bmatrix} \underline{n} \\ -\frac{1}{q}\underline{n} \end{bmatrix}$$

$$= \frac{k}{h^2}(\delta\underline{x} \cdot \underline{n} - h\delta\underline{\theta} \cdot \underline{n}) \begin{bmatrix} \underline{n} \\ -h\underline{n} \end{bmatrix}$$

A screw spring can only transmit a specified combination of force along and torque about the component axis 63 to the floated body 5. For the rotational-type screw spring 400, that combination is directly related to the pitch of the ball screw 487 used as the axis free joint 485. The wrench transmitted is the same as that of a translational-type screw spring except the effective stiffness constant is scaled.

Using line springs 100, torsional springs 200, and screw springs 300, 400, any spatial stiffness matrix can be achieved. Procedures for the decomposition of spatial stiffness matrices into a set of elastic components are identified in Huang and Schimmels, IEEE, 1997.

The present invention is related to research conducted and set forth by the inventors in Appendix I.

Various alternatives and embodiments are contemplated as being within the scope of the following claims particularly pointing out and distinctly claiming the subject matter regarded as the invention.

We claim:

1. A spatial parallel compliant mechanism for interconnecting a support body to a floated body, the mechanism comprising:
 a plurality of passive elastic components connected in parallel between the support body and the floated body, each of the elastic components having a stiffness, a pitch and a longitudinal axis, and at least one of the elastic components being constructed and arranged to transmit force along and torque about its longitudinal axis.

2. The mechanism of claim 1, wherein each elastic component is of a type selected from a group consisting of line springs, torsional springs, and screw springs.

3. The mechanism of claim 1, wherein the elastic components are translational-type screw springs and rotational-type screw springs.

* * * * *